(12) United States Patent
Porter

(10) Patent No.: US 7,194,951 B1
(45) Date of Patent: Mar. 27, 2007

(54) BEVERAGE PRESS MUG WITH STORAGE CONTAINER

(75) Inventor: Mark D. Porter, Missoula, MT (US)

(73) Assignee: Planetary Design, LLC, Missoula, MT (US)

( * ) Notice: Subject to any disclaimer, the term of this patent is extended or adjusted under 35 U.S.C. 154(b) by 203 days.

(21) Appl. No.: 11/034,354

(22) Filed: Jan. 13, 2005

(51) Int. Cl.
*A47J 31/18* (2006.01)
*B65D 21/02* (2006.01)

(52) U.S. Cl. .................. 100/116; 100/125; 99/287; 99/297; 220/23.87; 220/625

(58) Field of Classification Search ............... 100/110, 100/116, 120, 125; 220/23.87, 23.89, 625; 99/287, 297
See application file for complete search history.

(56) References Cited

U.S. PATENT DOCUMENTS

| | | | |
|---|---|---|---|
| 3,275,180 A * | 9/1966 | Optner et al. ............... | 206/521 |
| 4,974,741 A | 12/1990 | Gustafson et al. | |
| 5,478,586 A * | 12/1995 | Connor ....................... | 426/431 |
| 5,531,353 A | 7/1996 | Ward et al. | |
| 5,887,510 A | 3/1999 | Porter | |
| 5,918,761 A | 7/1999 | Wissinger | |
| 6,409,038 B1 | 6/2002 | Karp | |

* cited by examiner

*Primary Examiner*—Lowell A. Larson
*Assistant Examiner*—Jimmy Nguyen
(74) *Attorney, Agent, or Firm*—Merchant & Gould P.C.

(57) ABSTRACT

A mug (10), specifically a vessel (20) incorporating a plunger assembly (30), that includes a number of fingers (42), is improved by positioning the fingers downwardly to contact the side wall of the vessel. The improvement also includes the following; a minor diameter portion (58) of the vessel sized to fit a motor vehicle cup holder. An open distal ended liner (62) intimately embracing a storage container compartment (60) formed on an inside surface of the outer shell minor diameter portion of the vessel. A closure base (66) removably engages the liner and encloses the bottom of the vessels storage container compartment. The closure base includes a number of inwardly facing spacer legs (68) that removably retain a storage container (72) including a detachable lid (74). The storage container provides a receptacle for such items as coffee grinds, tea leaves, sugar and creamer etc. such that the items may be conveniently available with the mug.

10 Claims, 8 Drawing Sheets

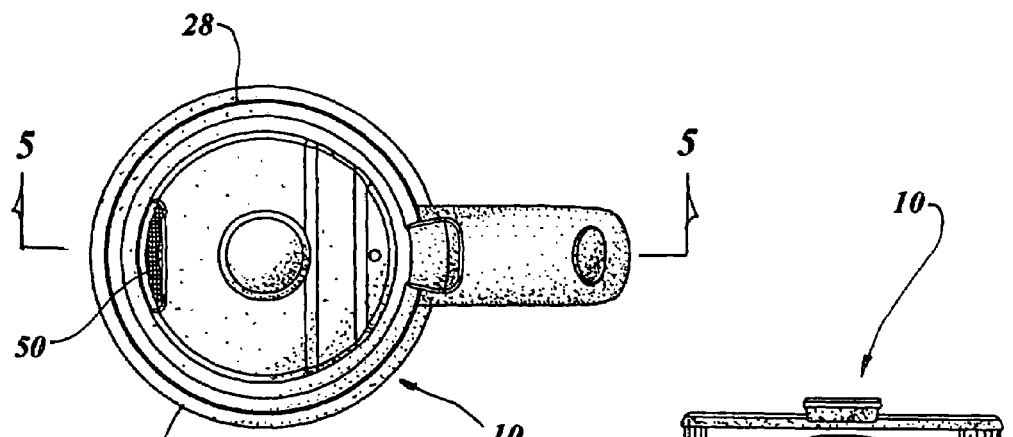
FIG. 2
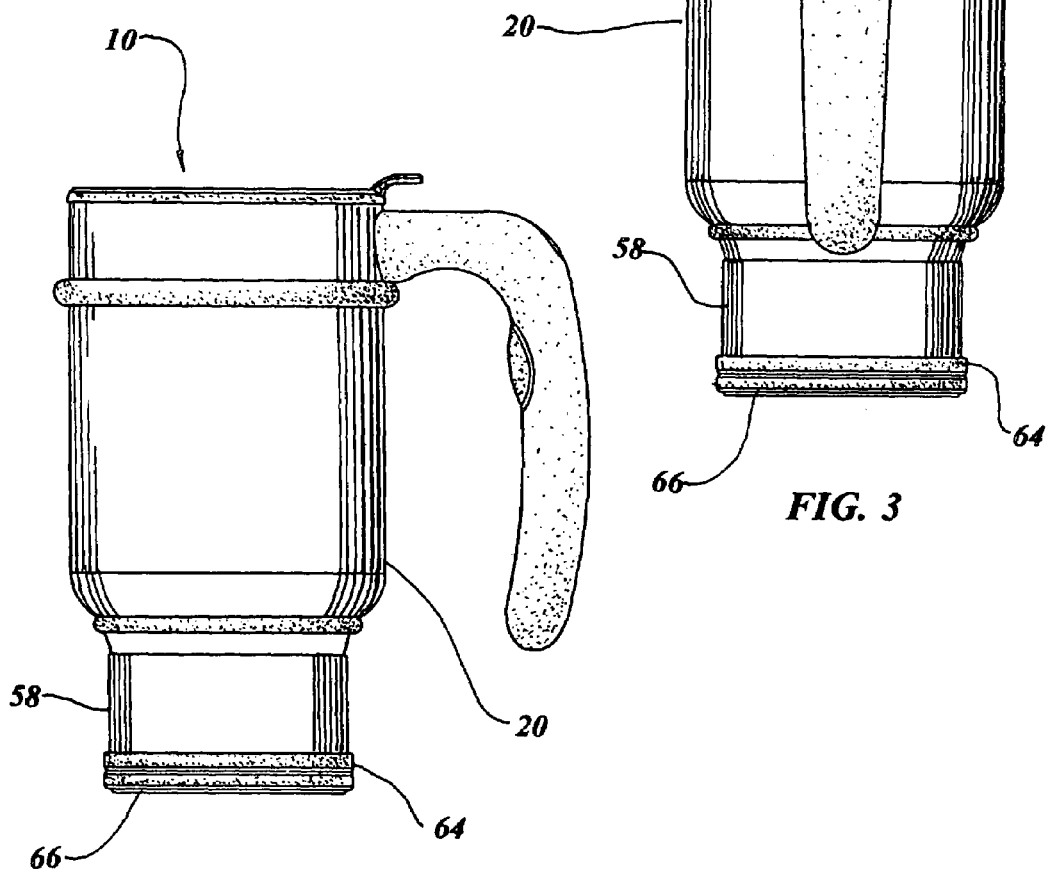
FIG. 3
FIG. 4

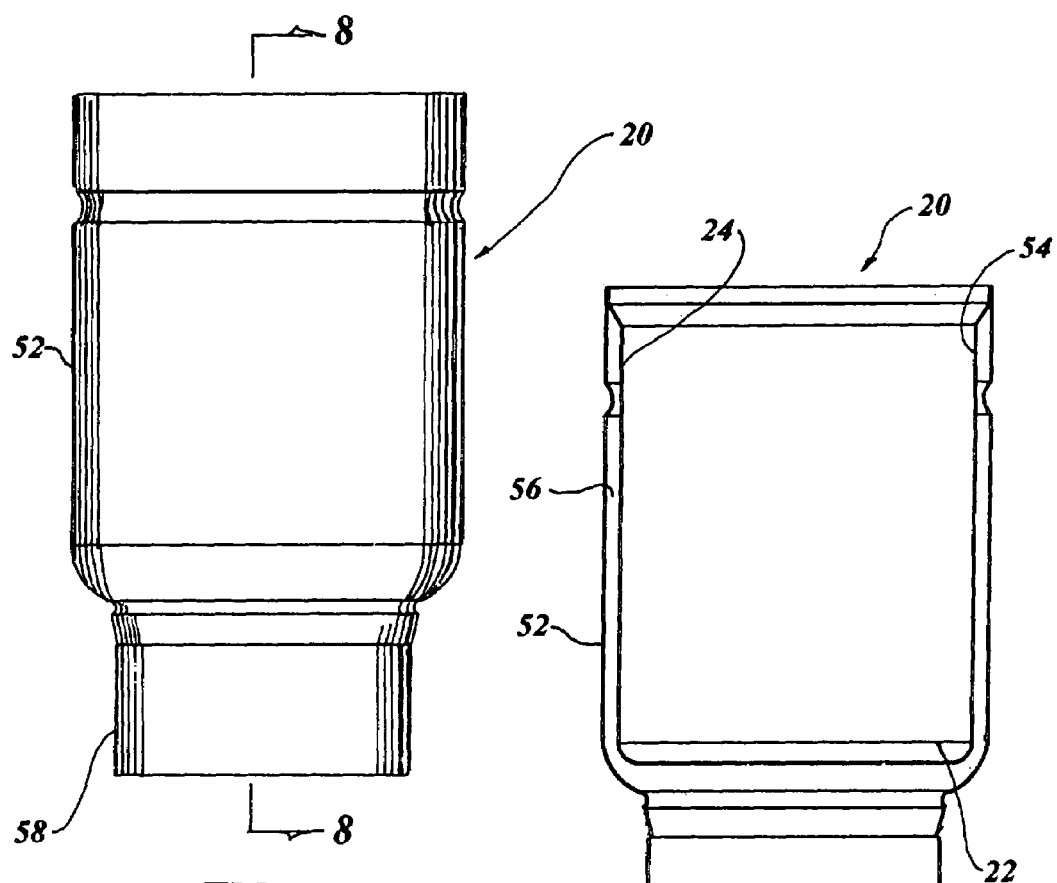
FIG. 7
FIG. 8
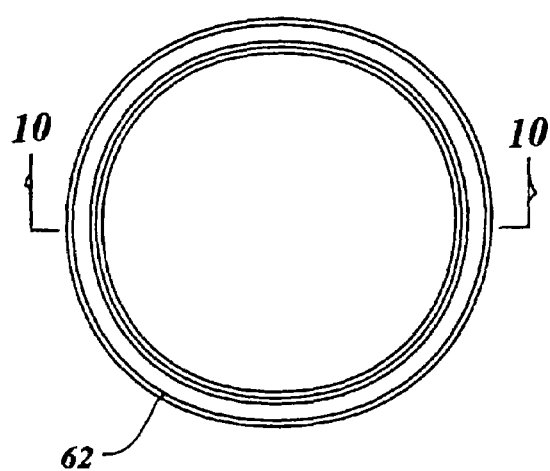
FIG. 9
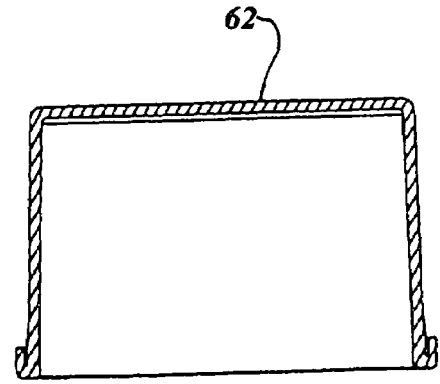
FIG. 10

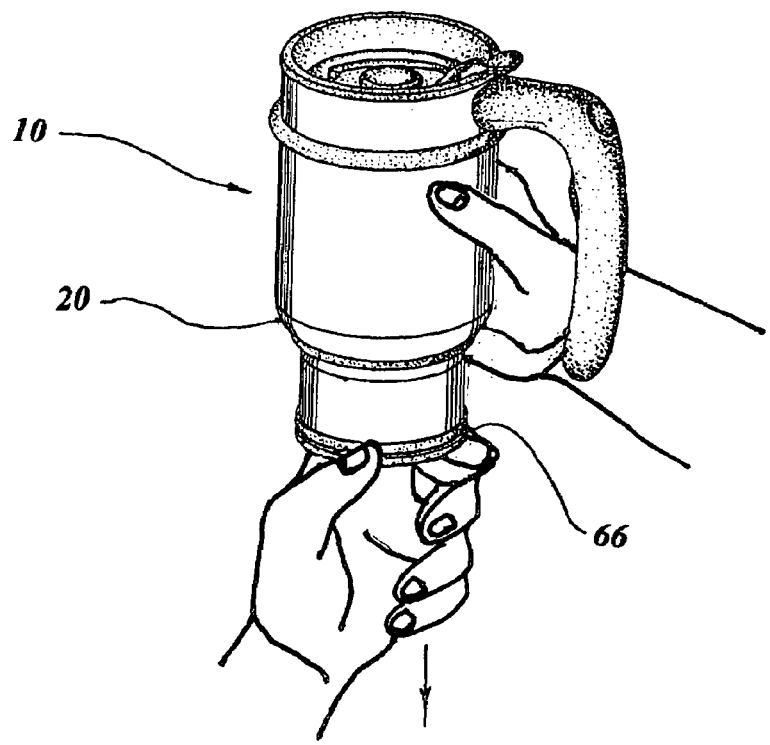
FIG. 18
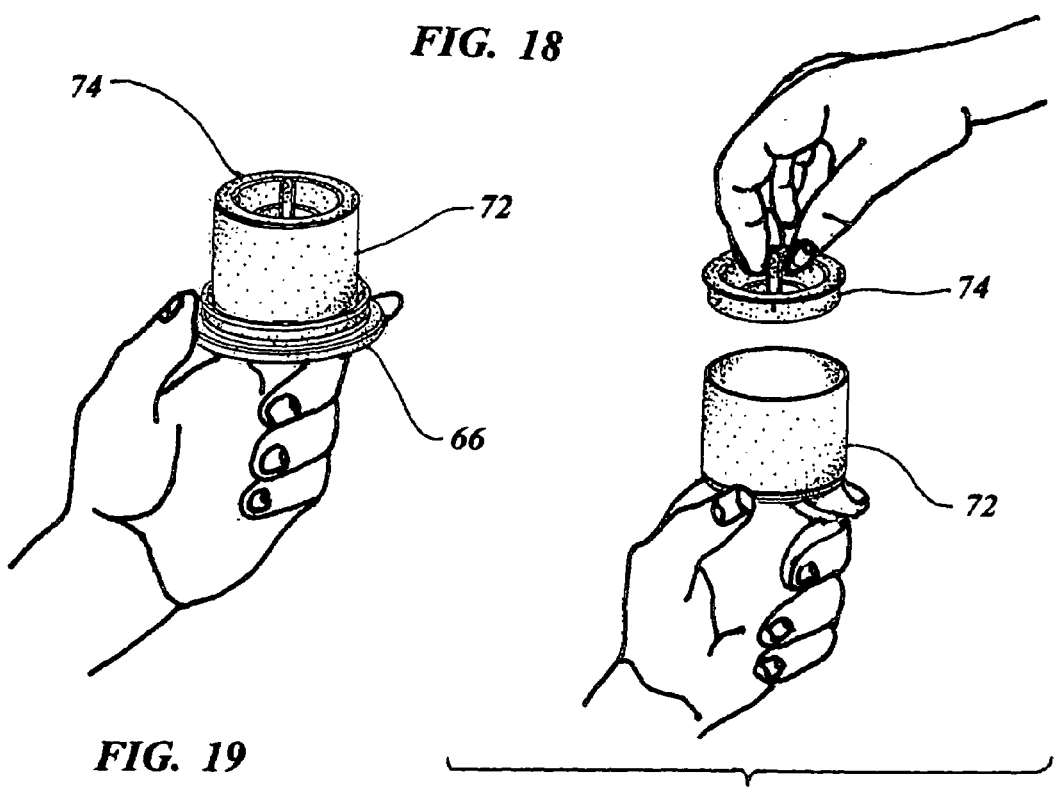
FIG. 19
FIG. 20

BEVERAGE PRESS MUG WITH STORAGE CONTAINER

TECHNICAL FIELD

The present invention relates to beverage containers in general. More specifically the invention is directed to a coffee or tea press container integrally combining a commuter press mug with a storage container.

BACKGROUND ART

Previously, many types of coffee or tea mugs have been used in endeavoring to provide an effective means to transport a beverage and maintain its temperature. Further portable coffee pots have been developed that are designated the "press type" having a filtered plunger permitting coffee grinds or tea leaves to be mixed with hot water. The plunger is inserted on top of the blended liquid and pressed to the bottom permitting the beverage to be ideally brewed and the residual filtered to the bottom.

The prior art listed below did not disclose patents that possess any of the novelty of the instant invention; however the following U.S. patents are considered to be related:

| U.S. Pat. No. | Inventor | Issue Date |
| --- | --- | --- |
| 4,974,741 | Gustafson et al. | Dec. 4, 1990 |
| 5,531,353 | Ward et al. | Jul. 2, 1996 |
| 5,887,510 | Porter | Mar. 30, 1999 |
| 5,918,761 | Wissinger | Jul. 6, 1999 |
| 6,409,038 | Karp | Jun. 25, 2002 |

Gustafson et al. in U.S. Pat. No. 4,974,741 teach a thermally insulated carrier with a tubular housing which accepts single or two serving beverage containers in a vehicle. A base extension is attached to the bottom of the carrier which is sized to fit into the can holder of a vehicle and maintain stabilization of the insulated carrier.

U.S. Pat. No. 5,531,353 issued to Ward et al is for a drinking cup having an open top and a base. A storage portion may be connected to the base of the cup portion and a cylindrical shoulder on the cup portion base mates with an open top on the storage portion. A removable lid receives either the cup portion or the storage portion.

Porter in U.S. Pat. No. 5,887,510 is my previous patent to which this improvement is directed. The patent discloses a portable device for making coffee which included a vessel for holding a mixture of coffee grinds and hot water. The invention includes a plunger, having a filter unit and a rod extending though the vessels top, that tightly contacts the side wall of the vessel. The plunger is configured to strain the coffee particles from the liquid as it travels through the mixture collecting the particles on the bottom with the remaining liquid available for drinking directly from the device or poured into a cup.

Wissinger in U.S. Pat. No. 5,918,761 teaches an insulated container with a cover constructed with an inner shell and an outer shell with a space in between. The cover is maintained with the combined shells at the top with an elastomeric material.

U.S. Pat. No. 6,409,038 issued to Karp is directed toward a mug that is normally too large to fit into a vehicle cup holder therefore it is fitted with a hollow base member that is appropriately sized for the utility. The base member may used to carry beverage accessories such as sugar, sweetener, creamer, tea or coffee. It is also possible to store liquids in the base member, such as extra coffee. Gaskets prevent leakage and cover members can be provided to close the base member when not connected to the mug.

DISCLOSURE OF THE INVENTION

The plunger method of brewing coffee is well known in the art and became particularly popular in France; therefore the technique is usually known as the "French Press". My U.S. Pat. No. 5,887,510 is directed to a device that includes a vessel, such as a mug, that has straight or slightly tapered interior walls which may be either an individual serving container or a multiple serving vessel. The device functions utilizing this vessel which is capable of holding a mixture of hot water and solid particles. An enhanced plunger and filter assembly is disclosed in my previous patent that consists of a plurality of fingers that form an intimate contact between the plunger and the sidewall when placed into the vessel. When the plunger is depressed to the bottom the seal prevents bypassing the particles permitting the brew to reach its full flavor after the mix had been allowed to steep for three to five minutes. The invention also allowed the brewed beverage to be consumed directly from the vessel.

The primary object is directed to improvements in my previous invention which incorporate relocating the plunger assembly action by reversing the direction the finger orientation relative to the vessel and utilizing a dual wall dead air space insulated vessel, preferably of stainless steel construction.

An important object of this improvement in the original invention is that the reversed fingers create a tighter wiping action against the vessel wall and preclude any leakage of particles into the completed brew.

The next object of the invention is the improvement of the vessel itself by the addition of a storage container that is housed within a hollow bottom portion of the vessel. This storage container includes a lid and is held in place with a closure base that is retained with a gasket pressing outwardly into the interior wall of the vessel's bottom portion. Further the closure base grips the storage container such that it is not free to touch any part of the container. The obvious purpose of the container is to store coffee grinds or tea leaves allowing the user quick access for a second cup or serving of the brewed beverage. It will be noted however that the added container may also house sugar and a creamer or the like to augment the beverages flavor.

Still another object of the invention is that the improvement of the storage container may be added to any type of vessel made of a host of materials including specialized shapes and purposes. One of the premium types of vessels presently in vogue, are the popular stainless steel mugs that have an inner and outer shell which is well adapted to the improvements particularly in the commuter type mug with a diameter on the bottom portion that is sized to fit into a motor vehicle cup holder.

Yet another object of the invention is the convenience that has been added to a coffee mug where the commuter may take a cup of coffee when he or she departs and make one or two cups upon arrival.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is a top view of the preferred embodiment.

FIG. 3 is a rear view of the preferred embodiment.

FIG. 4 is a right side view of the preferred embodiment.

FIG. 7 is a front view of the vessel in the preferred embodiment completely removed from the invention for clarity.

FIG. 8 is a cross sectional view taken along lines 8—8 of FIG. 7.

FIG. 9 is a top view of the liner in the preferred embodiment completely removed from the invention for clarity.

FIG. 10 is a cross sectional view taken along lines 10—10 of FIG. 9.

FIG. 18 partial isometric view of closure base being manually removed from the vessel the preferred embodiment.

FIG. 19 partial isometric view of the closure base after it has been manually removed from the vessel.

FIG. 20 partial isometric view of the lid being manually removed from the storage container after being detached from the closure base.

BEST MODE FOR CARRYING OUT THE INVENTION

Figure 1:
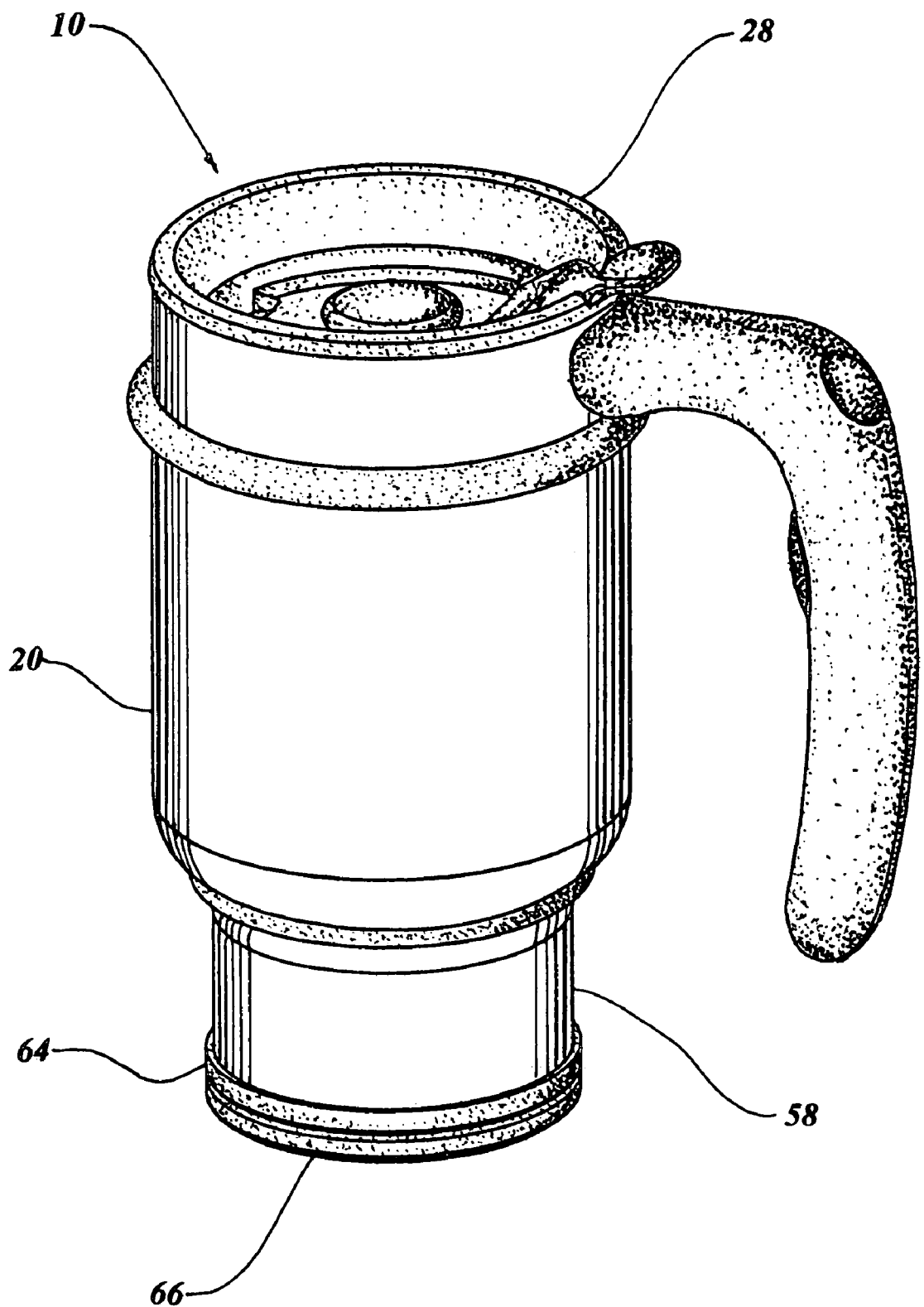
FIG. 1 is a partial isometric view of the beverage press mug with a storage container in the preferred embodiment.

The best mode for carrying out the invention is presented in terms of a preferred embodiment with slight variations in the type of mug being utilized. This preferred embodiment of the beverage mug with a storage container 10 is shown in FIGS. 1 thorough 20 and is comprised of a beverage press mug defined as a vessel 20 that has a bottom end 22, a straight side wall 24 and a top-opening 26 with a cover 28. A plunger assembly 30 with a rod 32 slideably penetrates through the cover 28 and is connected to a hub 34 with spokes 36 that extend outwardly connected to a peripheral base member 38 with a plunger filter 40 located therebetween. The base member 38 includes a plurality of fingers 42 each having a first phalange 44 and a second phalange 46 extending outwardly at an angle creating intimate contact with the side wall 24.

All of the above elements are disclosed in my previous patent U.S. Pat. No. 5,887,510. The improvements to this patent include changing the position of the first phalange 44 to extend downwardly and outwardly from the peripheral base member 38. Specifically the first phalange 44 joins the second phalange 46 at an angular intersection, with the second phalange 46 extending from the angular intersection downwardly and inwardly for contacting the essentially straight side wall 24 of the vessel 20.

Further the plunger assembly 30 contains a circular extension spring 48 that surrounds the plunger assembly 30 functioning in conjunction with the external force of manually pressing down on the rod 32 which decreases the plunger diameter against spring tension thereby intimately engaging the side wall 24 creating a continual constricting contact with the beverage press mug vessel 20. The spring action in conjunction with the reversed position of the fingers 42 improves the wiping action considerably and hence provides almost complete the elimination of particle bypass.

Another improvement is that the vessel cover 28 now includes a cover filter 50, shown in FIG. 2 which is integrated within the cover 28 for straining any solid particles that may inadvertently remain from liquid contained within the vessel when the liquid, in the form of a brewed beverage, is poured therefrom assuring complete purity of the beverage.

The beverage press mug vessel 20 preferably incorporates an outer shell 52 and an inner shell 54 with a space 56 therebetween, as illustrated in FIGS. 1–5, 7 and 8. The outer shell 52 and inner shell 54 are formed of stainless steel and the space 56 therebetween forms a dead air space acting as an insulated barrier well known in the art and effectively impedes the transfer of heat.

Where the application is for a commuter mug application the outer shell 52 has a minor diameter portion 58 that is smaller than its upper section and extends beneath the inner shell 54 forming a storage container compartment 60 within the extended minor diameter portion 58. The minor diameter portion 58 is sized to fit a conventional motor vehicle cup holder increasing the utility of the invention.

Figure 5:
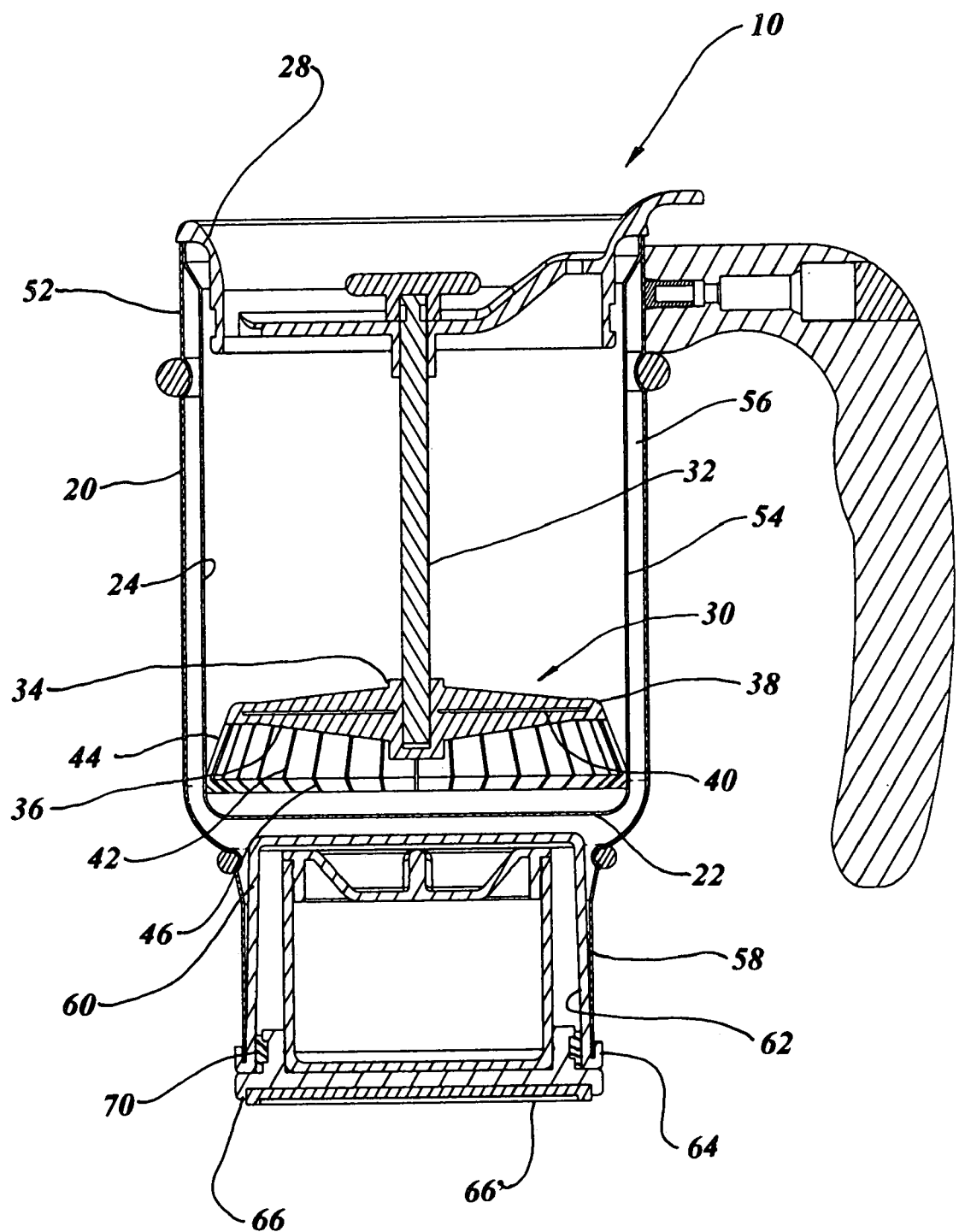
FIG. 5 is a cross sectional view taken along lines 5—5 of FIG. 2.
Figure 6:
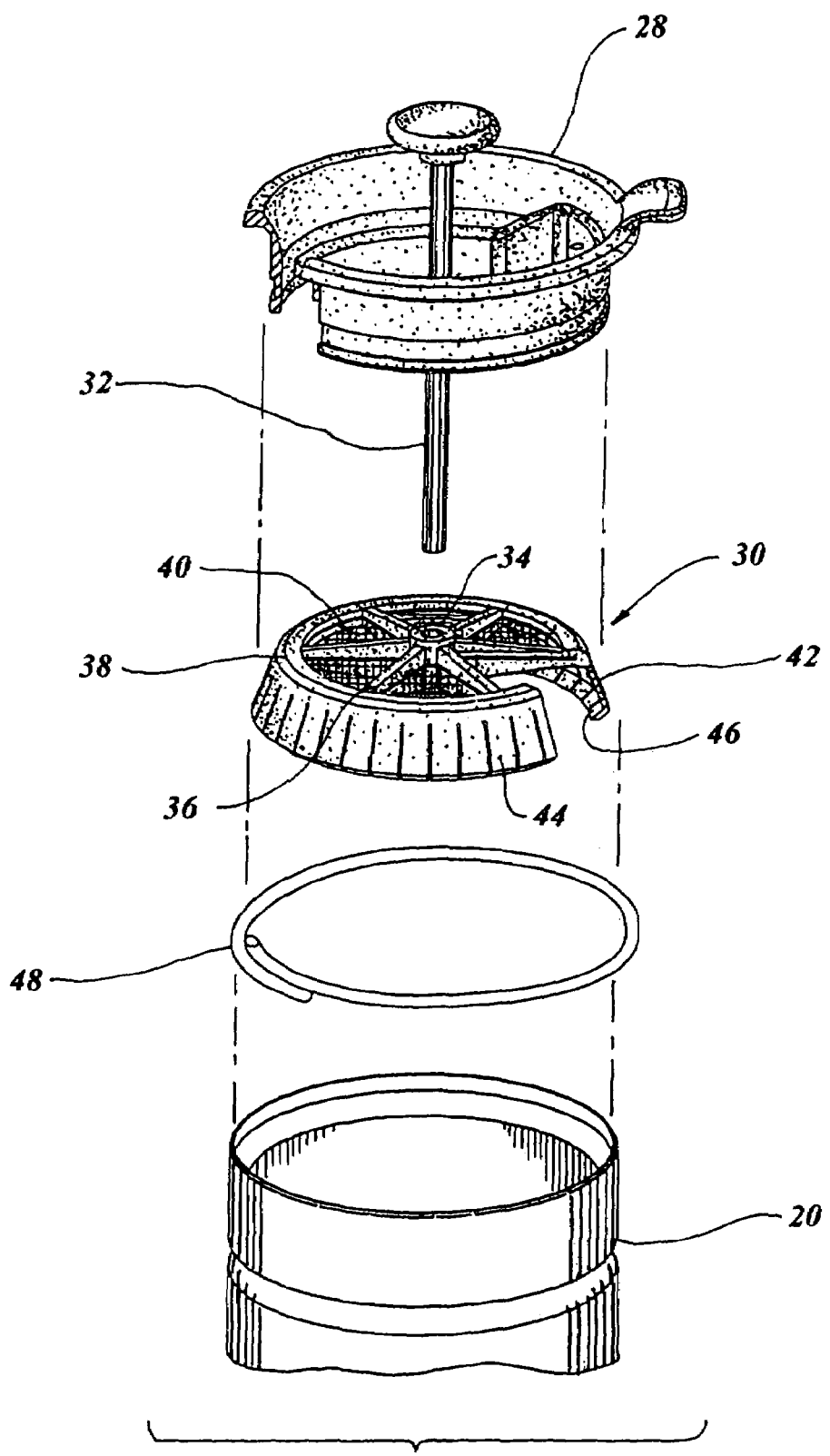
FIG. 6 is an exploded partial isometric view of the plunger assembly in the preferred embodiment completely removed from the invention for clarity.

An optional open distal ended liner 62 intimately embraces the storage container compartment 60 on an inside surface of the outer shell minor diameter portion 58 and on a bottom surface of the inner shell 54, as shown in FIG. 5. The storage container liner 62 is illustrated by itself in FIGS. 9 and 10 and incorporates an integrally formed U-shaped lip 64 interfacing with the bottom of the minor diameter portion 58. The liner 62 is held in place with an interference fit tightly engaging the inside surface of the outer shell minor diameter portion 58. While the liner 62 is shown and described throughout the specification and claims, it is not to be construed as completely essential to the invention as its presence is valuable particularly in the stainless steel construction however other materials may negate its desirability.

Figure 11:
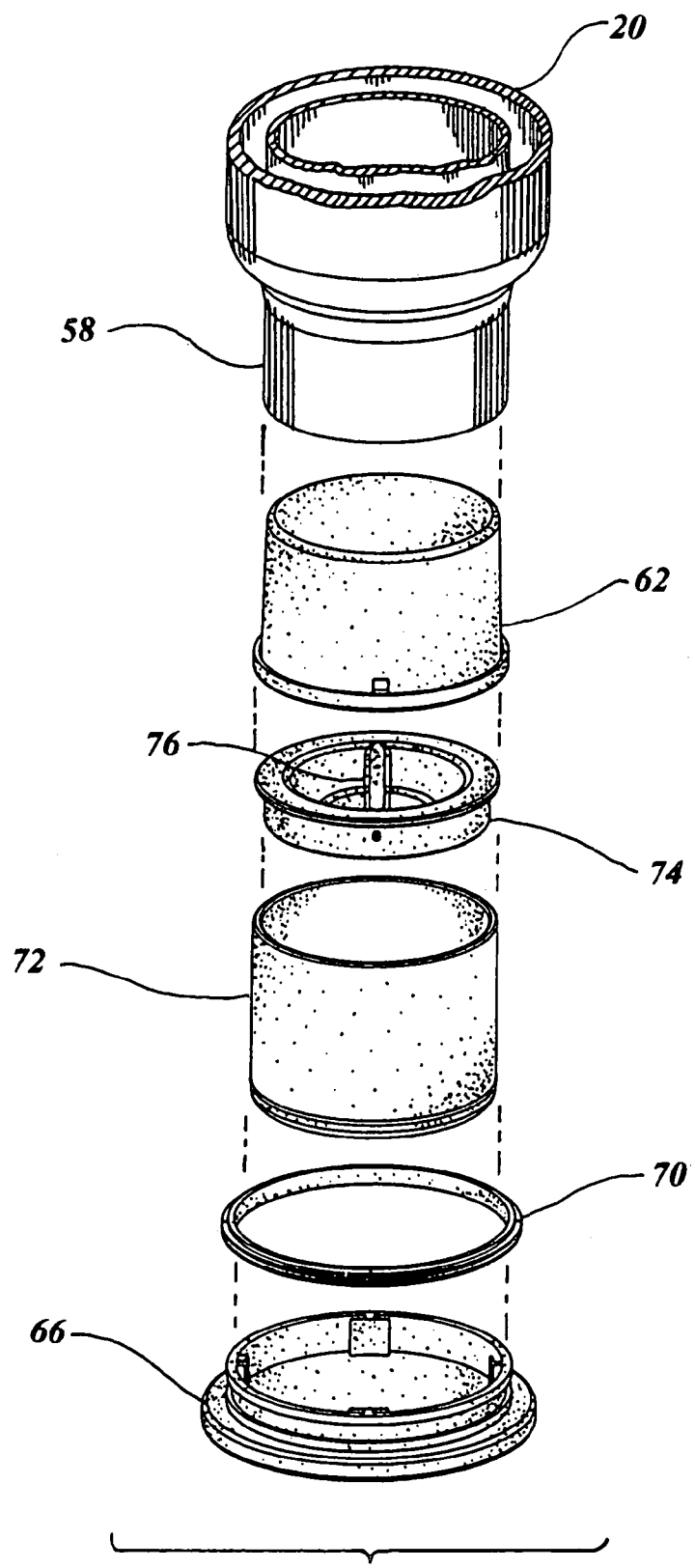
FIG. 11 is an exploded partial isometric view of the storage container elements in the preferred embodiment, completely removed from the invention for clarity.
Figure 12:
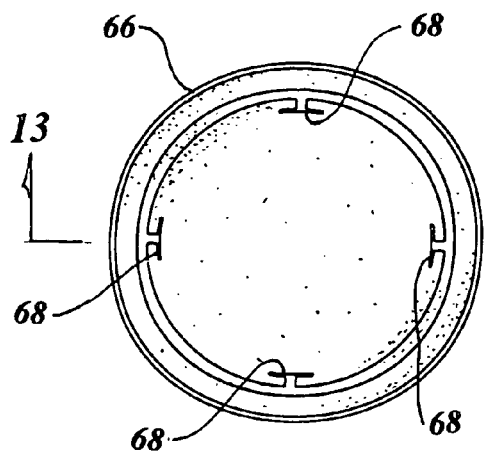
FIG. 12 is a top view of the closure base in the preferred embodiment completely removed from the invention for clarity.
Figure 13:
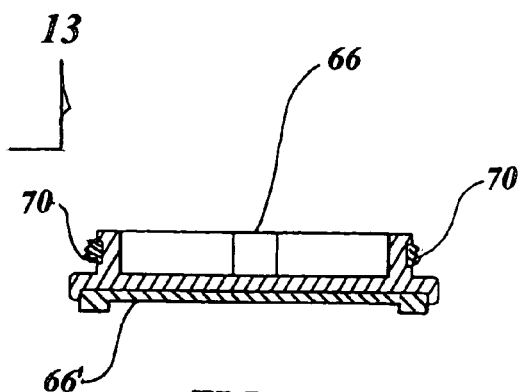
FIG. 13 is a cross sectional view taken along lines 13—13 of FIG. 12.

A closure base 66, illustrated in FIGS. 11–13, removably engages the open distal ended portion of the liner 62. The closure base 66 consists of a plurality of opposed inner facing spacer legs 68 that extend inwardly a sufficient distance to releasably retain a storage container therebetween as depicted in FIGS. 5, 11 and 19. The closure base 66 has a resilient gasket ring 70 surrounding an outer perimeter of the base 66 attached into a peripheral groove. The gasket ring 70 is compressed when the base 66 positioned within the liner 62 or in the vessel minor diameter portion 58 when the liner 62 is not used. A resilient pad 66' is attached to the underside of the base 66 for restraining the vessel 20 when resting on a flat surface such as a table or desk.

Figure 14:
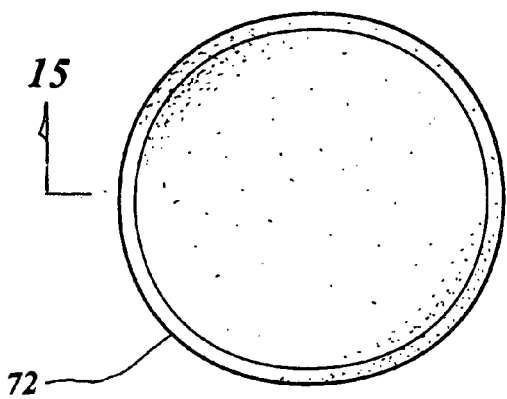
FIG. 14 is a top view of the container in the preferred embodiment completely removed from the invention for clarity.
Figure 15:
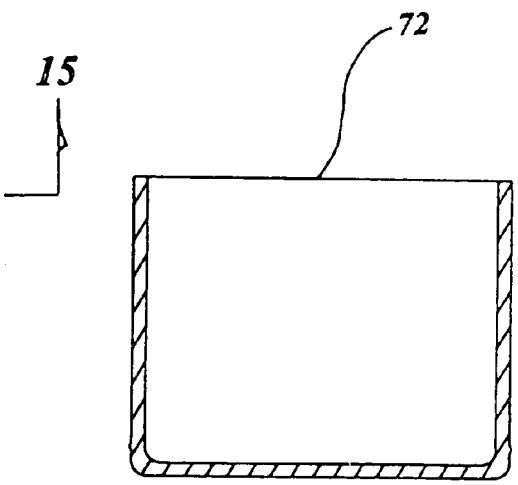
FIG. 15 is a cross sectional view taken along lines 15—15 of FIG. 14.
Figure 16:
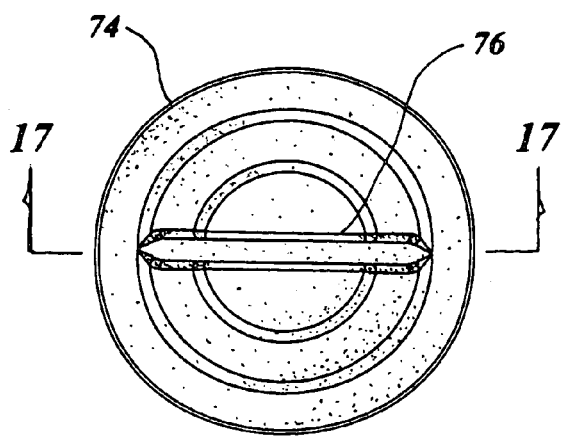
FIG. 16 is a top view of the container lid in the preferred embodiment completely removed from the invention for clarity.
Figure 17:
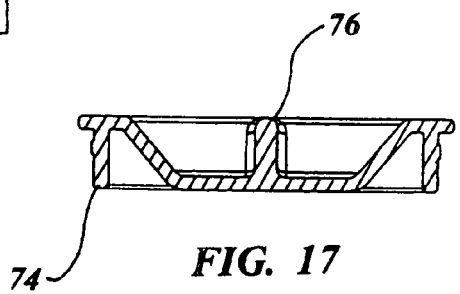
FIG. 17 is a cross sectional view taken along lines 17—17 of FIG. 16.

A storage container 72, having a detachable lid 74, is removably retained by the closure base 66 as shown pictorially in FIG. 19. The storage container 72 is designed to store such items as coffee grinds, tea leaves, sugar and creamer etc. The container 72 is illustrated alone in FIGS. 14 and 15 and the lid 74 in FIGS. 16 and 17. The lid 74 is held in place with a slip fit interface dimensionally toleranced such that it may be removed and replaced easily but will stay in place by itself. The storage container 72 consists of a cylindrical tube having a solid bottom and a single open end on the top, while the lid 74 is configured to have a recessed finger gripping rib 76 for manually removing the lid 74 from the container 72, as illustrated in FIG. 20.

The open distal ended liner 62, closure base 66, storage container 72 and storage container lid 74 are preferably formed of a thermoplastic material such as polypropylene, polyethylene, cellulose acetate, nylon, poly vinyl chloride and the like.

While the preferred embodiment incorporates a beverage press mug with a storage container 10, the storage container 72 may be added to any mug or vessel having a similar configuration and utility. The vessel 20 may or may not have the minor diameter portion 58 and still function properly as the invention also the improvements in the press may be eliminated and the storage container function easily retained. Likewise the vessel 20 material may be stainless steel, aluminum, thermoplastic, glass, china or the like either insulated or un-insinuated and still retain the patentable features.

FIG. 18 illustrates manual removal of the closure base 62, including the container 72 attached therein, from the vessel 20. FIG. 18 depicts the container 72 being in position to be removed from the closure base 62 while FIG. 20 shows the lid 74 removed from the container 72 that has previously been detached from the closure base 62.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A beverage press mug including a vessel having a bottom end, a side wall and a top-opening with a cover, also a plunger assembly with a rod slideably extending through the cover, said rod connected to a hub with spokes extending outwardly to a peripheral base member containing a plunger filter therebetween, the base member having a plurality of fingers each having a first phalange and a second phalange extending outwardly at an angle creating intimate contact with the side wall, wherein the improvement comprises, said first phalange extending downwardly and outwardly from said peripheral base member and joining said second phalange at an angular intersection, said second phalange extending from said angular intersection downwardly and inwardly for contacting said side wall of said vessel, said beverage press mug vessel having an outer shell and an inner shell and a space therebetween, said outer shell having a minor diameter portion extending beneath said inner shell forming a storage container compartment on said extended minor diameter portion, an open distal ended liner intimately embracing the storage container compartment on an inside surface of said outer shell minor diameter portion and on a bottom surface of said inner shell, a closure base removably engaging the open distal ended portion of said liner, and a storage container having a detachable lid, said storage container is removably retained by said closure base, such that items including coffee grinds and tea leaves may be stored therein.

2. The beverage press mug as recited in claim 1 wherein said plunger assembly with a rod slideably extending through the cover further comprises, a circular extension spring surrounding said plunger functioning in conjunction with an external force pressing down on said rod decreasing the plunger diameter against spring tension when intimately engaging an essentially straight side wall, creating constricting contact with the beverage press mug vessel.

3. The beverage press mug as recited in claim 1 wherein said vessel cover further comprises a filter disposed within said cover for straining solid particles from liquid contained within said vessel when poured therefrom.

4. The beverage press mug as recited in claim 1 wherein said beverage press mug vessel outer shell and inner shell formed of stainless steel and said space therebetween forming a dead air space acting as an insulated barrier.

5. The beverage press mug as recited in claim 1 wherein said minor diameter portion sized to fit a motor vehicle cup holder.

6. The beverage press mug as recited in claim 1 wherein said storage container liner further comprises an integrally formed U-shaped lip interfacing with a bottom surface of said minor diameter portion.

7. The beverage press mug as recited in claim 1 wherein said closure base further comprises a plurality of opposed inner facing spacer legs extending inwardly a sufficient distance to releasably retain said storage container therebetween.

8. The beverage press mug as recited in claim 1 wherein said closure base further comprises a resilient gasket ring surrounding an outer perimeter of said base such that the gasket ring is compressed when the base is interfaced with the open distal ended liner positioned within the vessel minor diameter portion.

9. The beverage press mug as recited in claim 1 wherein said open distal ended liner, closure base, storage container and storage container lid are formed of a thermoplastic material selected from the group consisting of polypropylene, polyethylene, cellulose acetate, nylon and poly vinyl chloride.

10. The beverage press mug as recited in claim 1 wherein said storage container further comprises a cylindrical tube having a single open end, wherein said lid is configured to interface with said storage container with a slip fit, and said lid having a recessed finger gripping rib member for manually removing the lid from the container.

* * * * *